(No Model.)

J. H. BROWN.
INSECT TRAP.

No. 396,024. Patented Jan. 8, 1889.

Attest.
Walter P. Keene
F. L. Middleton

Inventor:
John H. Brown.
by Ellis Spear
Atty.

UNITED STATES PATENT OFFICE.

JOHN HAMILTON BROWN, OF NEW YORK, N. Y., ASSIGNOR TO GEO. C. TEWKSBURY, OF SAME PLACE.

INSECT-TRAP.

SPECIFICATION forming part of Letters Patent No. 396,024, dated January 8, 1889.

Application filed August 27, 1888. Serial No. 283,899. (No model.)

*To all whom it may concern:*

Be it known that I, JOHN HAMILTON BROWN, of New York, in the county of New York and State of New York, have invented a new and useful Improvement in Insect-Traps; and I do hereby declare that the following is a full, clear, and exact description of the same.

My invention is an improved insect-trap, designed more especially for entrapping roaches. The trap is of that class in which a base, formed preferably of wood, is combined with a suitable cover of woven wire or similar material admitting the light freely and serving to prevent the passage of the insect.

The invention relates to the construction of the base, whereby a very effective trap is provided at very little cost.

In the accompanying drawings the invention is illustrated.

Figure 1:
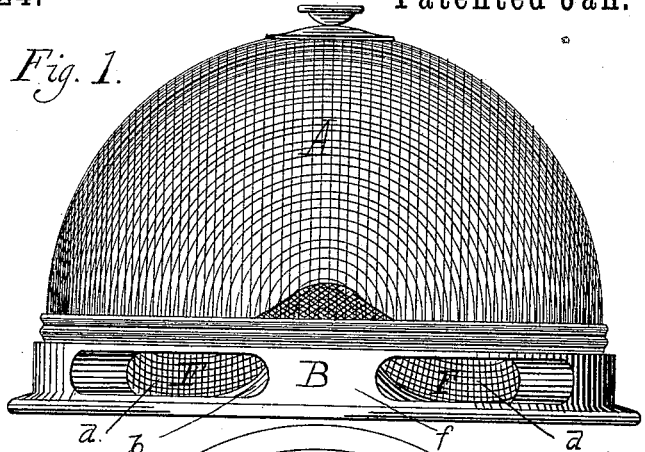
Figure 2:
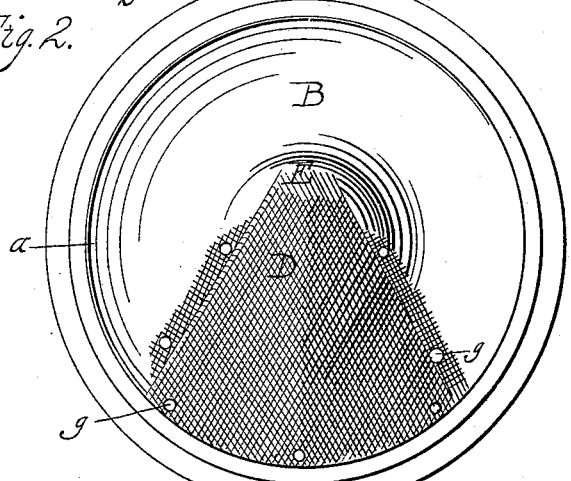
Figure 3:
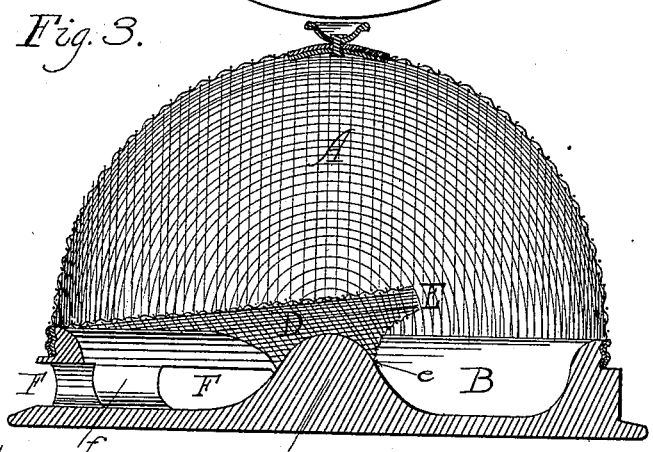

Figure 1 represents a side elevation of the trap. Fig. 2 is a plan view of the base. Fig. 3 is a central section across the mouth of the trap.

In the drawings, A represents the cover or upper part of the trap, of woven wire, and in all respects like an ordinary wire cover.

B represents the wooden base, preferably round and turned with a flange, $a$, over which the cover fits snugly. The interior part of the base is turned out in dish shape with a central cone, $b$. This cone is provided with a covered passage formed of screen-wire, (indicated at D.) This is made of a single piece of wire screen or woven wire, the outer edge of which is tacked to the edge of the dish on the upper part of the flange $a$. The other sides, $d\ d$, of the wire-cloth, which form the covered way, are bent downward to form vertical walls converging to a point, E, which extends a little over the point of the cone. The lower edges of the wire walls are brought together and united at $e$ a little below the top of the cone and on the side of the cone away from the entrance. This leaves a point in approximately tubular form. The end of the point is open, forming the mouth or exit of the covered way into the trap. The wires of the fabric form sharp points at the mouth projecting inwardly toward the cavity of the trap. The entrance to the trap is through orifices F F, cut horizontally through the wall of the case. I have shown two of these orifices. The outer ends of these coincide with the converging walls of the covered way. Between these two is left a solid piece, $f$, as a support for the flange, which would be weakened if a single opening were cut of the same width. The conical form of the bottom (the cone being flat and gradually sloping up from the bottom to the top) presents a gradual inclination for the passage of the insect, and the passage is easy in the whole covered way from the entrance to the exit in the trap. At the same time the mouth of the covered way projects over the top of the cone, and the bottom directly thereunder slopes away from it, and this renders it impossible for the insect to climb to the entrance in returning or to escape from the trap.

The trap is practically thus composed of only two special pieces—the bottom, turned or formed in the shape described, and a single piece of wire-netting bent or struck up to form the covered way. The top is of the ordinary form of cover known in the market. The form of the covered way is easy and cheap to make and apply, being held by a few tacks, as $g$, on the margins.

My invention includes the conical bottom and covered way having converging sides, whether straight or curved, with the narrow exit projecting over the top of the curve.

In using this trap the wooden base is treated with some solution that will attract the insect, and it is necessary only to occasionally wipe the outside of the trap around the hole with a small piece of rag dipped in sweetened water or sirup, leaving the rag inside the trap; or any of the ordinary baits used for such insects may be placed in the trap instead of the rag.

I am aware that insect-traps have been heretofore devised with conical entrances from the outside opening at their smaller ends into the trap beneath a truncated wire-gauze cone. I do not therefore claim a converging covered way of wire-gauze having a small end opening into the trap, but limit myself to the combination herein specified, in which the conical bottom is an essential element.

I claim as my invention—

An insect-trap consisting of a dish-shaped base having a bottom within the dish formed as a low cone and provided with an aperture through the side or wall, in combination with the covered way leading from the aperture to a narrow opening within the trap, the said covered way being formed of woven wire, the edges of which are attached to the wall and bottom of the dish, and having a mouth at the inner end projecting over the top of the cone, the said base having also a suitable cover, all substantially as described.

In testimony whereof I have signed my name to this specification in the presence of two subscribing witnesses.

JOHN HAMILTON BROWN.

Witnesses:
C. H. LAWTON,
GEO. C. TEWKSBURY.